United States Patent [19]

Persha et al.

[11] 4,165,160
[45] Aug. 21, 1979

[54] LAMP ASSEMBLY AND POWER MODULE FOR FANLESS MICROFICHE READER

[75] Inventors: Thomas J. Persha; Eino M. Lehto, both of Juneau; Richard Dueck, Hartford; Nick Hechimovich, Horicon, all of Wis.

[73] Assignee: Bell & Howell Company, Chicago, Ill.

[21] Appl. No.: 905,816

[22] Filed: May 15, 1978

Related U.S. Application Data

[63] Continuation-in-part of Ser. No. 851,833, Nov. 16, 1977.

[51] Int. Cl.² ............... G03B 21/16; G03B 21/28
[52] U.S. Cl. .............................. 353/55; 353/61; 353/78
[58] Field of Search ............. 353/52, 55, 61, 27 R, 353/78

[56] References Cited

U.S. PATENT DOCUMENTS

| 2,060,560 | 11/1936 | Ellis | 353/61 |
| 2,701,979 | 2/1955 | Pratt et al. | 353/27 R |
| 3,413,061 | 11/1968 | Simpson et al. | 353/52 |
| 3,885,867 | 5/1975 | Nelson et al. | 353/27 R |

Primary Examiner—Steven L. Stephan
Attorney, Agent, or Firm—Alan B. Samlan; Harry G. Thibault

[57] ABSTRACT

A lamp assembly and power module is provided for a microform display apparatus, such as a fanless microfiche reader. The lamp assembly and power module are both situated in a drawer which is removably inserted into the base of the reader to form a air-restricted path for the efficient convection of heat away from the reader. By setting the lamp at an angle to the longitudinal axis of the drawer, both the lamp assembly and power module components can fit in the drawer. The front end of the drawer is provided with a grille for air passage, and a chimney structure is situated adjacent the rear of the drawer for the efficient evacuation of heat. The lamp and power module are located below the chimney, and as the lamp and power module components heat the surrounding air, the air rises up the chimney and out of the reader by convection. This air movement creates a draft through the grille in the front of the drawer, which serves to sufficiently cool the components.

5 Claims, 3 Drawing Figures

LAMP ASSEMBLY AND POWER MODULE FOR FANLESS MICROFICHE READER

This application is a continuation-in-part of copending application Ser. No. 851,833, filed Nov. 16, 1977.

This invention relates to microform display systems and more particularly to lamp assemblies and power modules for fanless microform display systems.

Microfiche film is a commonly used form of storing documents or graphical forms of information. Retrieval of the information stored on the microfiche requires the use of microform display systems such as microfiche reader apparatus. Such reader apparatus are well known, and use a variety of means for performing their functions. Present day microfiche readers commonly use a light source, which may be a high intensity lamp, optical means for condensing the light from the lamp and directing the light through the microfiche film, and a second set of optics for projecting the film image onto a screen,. A power supply device comprising a voltage transformer is also commonly used to step down line voltage to the voltage utilized by the lamp.

The components of present day microfiche readers discussed above, namely, the lamp and power transformer, generate substantial amounts of heat while in operation, and consequently require some means for cooling. One means for such cooling is to ventilate these components with an air flow produced by a fan. However, fan driven cooling systems present several disadvantages. One disadvantage is that the noise produced by the fan may distract the operator of the microfiche reader, and may cause considerable operator discomfort. A further disadvantage to a fan driven cooling system is the additional electric current and subsequent cost involved to operate the fan. Still another disadvantage of a fan is that vibrations caused by the fan motor can disturb the image on the screen. Thus, there is a need for an efficient, but fanless cooling system in a microfiche reader.

A second requirement for the lamp and transformer components of a microfiche reader is ease of access. Lamp bulbs burn out and must be replaced. The transformer and auxilliary wiring comprising the power source for the lamp may also wear out or malfunction, requiring repair or replacement. Thus, there is a need for a microfiche reader which provides quick and easy access to the lamp and power source.

Accordingly, an object of this invention is to provide a lamp assembly and power source module for a fanless microfiche reader. A more particular object is to provide a single fanless ventilation system and method for adequately cooling both the lamp and transformer of a microfiche reader.

It is a further object to provide a fanless ventilation system and method utilizing a dichroic reflector behind the lamp to facilitate heat dissipation through a chimney at the rear of a microfiche reader.

Yet another object is to provide a lamp assembly and power module which can be housed as a single unit. A further object is to provide such a unit that can quickly and easily be removed from the microfiche reader for service and repair of the lamp and power module components therein.

In keeping with one aspect of this invention, a drawer is provided which contains the lamp assembly and power module for a microfiche reader. Within the drawer the lamp is set at an angle to the longitudinal axis of the drawer to provide space in the drawer for the power module.

The drawer is removably insertable into the base of the reader. At the front end of the drawer a grille is provided to allow air to flow through the drawer. In addition, a verticallly rising chimney is located in the reader housing in communication with the rear of the drawer. The angled light path allows lamp and transformer to be located in the rear of the drawer, substantially beneath the chimney. The drawer is removably inserted in the housing to form a unitary restricted air chamber between the housing, drawer and chimney. As the air in the drawer becomes heated by the lamp and the transformer, the hot air will rise up the chimney, and exit at the top rear of the reader. Once this air movement is created, additional air will enter through the grille in the front of the drawer by convection currents created by air rising in the chimney. Thus, a constant draft will be created through the drawer and chimney which cools the lamp assembly and power module.

The above mentioned and other features of this invention and the manner of obtaining them will become more apparent, and the invention itself will be best understood by reference to the following description of a preferred embodiment of the invention taken in conjunction with the accompanying drawings in which.

Figure 1:
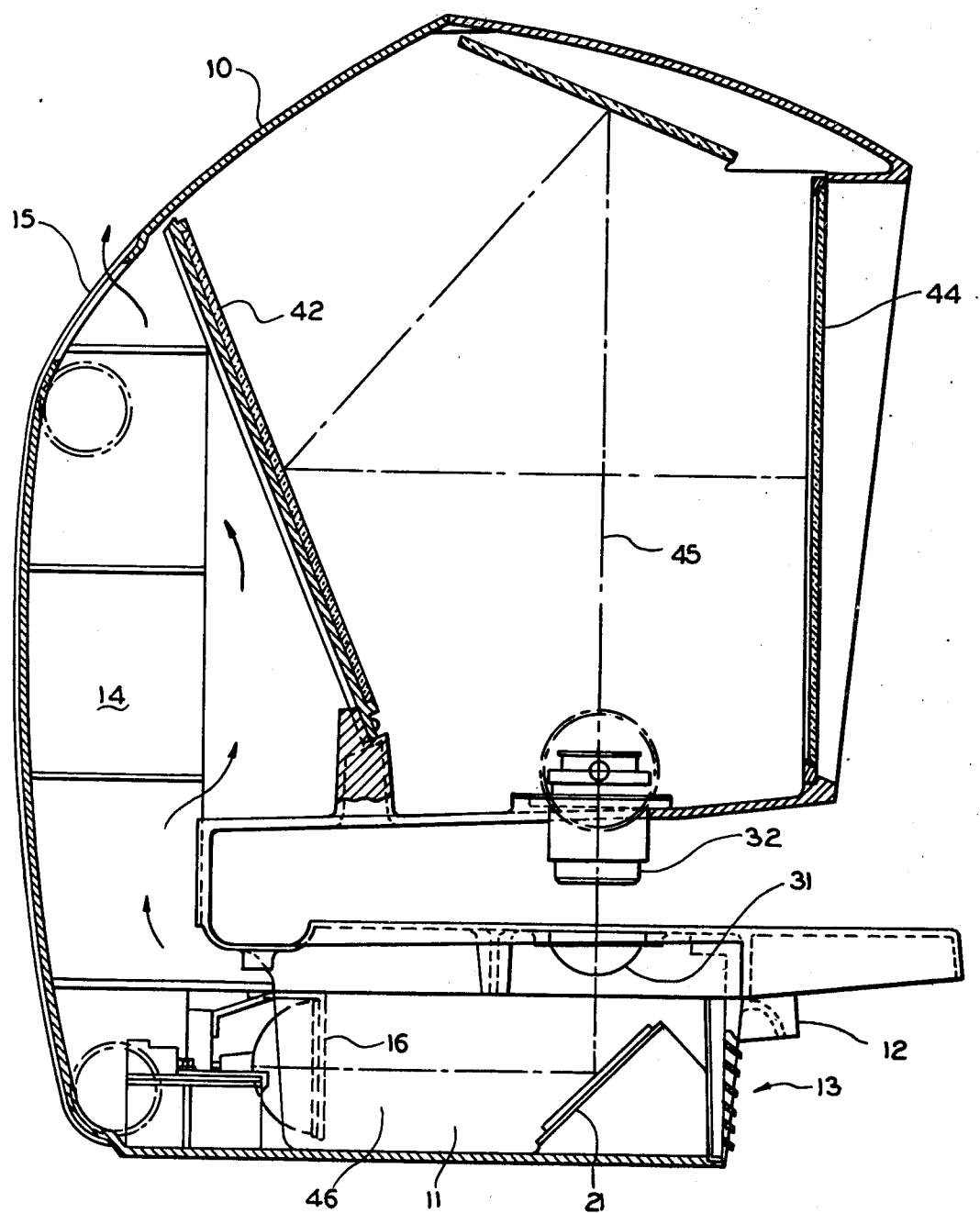
FIG. 1 is a side sectional view of the microfiche reader of the present invention showing the drawer in a fully closed position.
Figure 3:
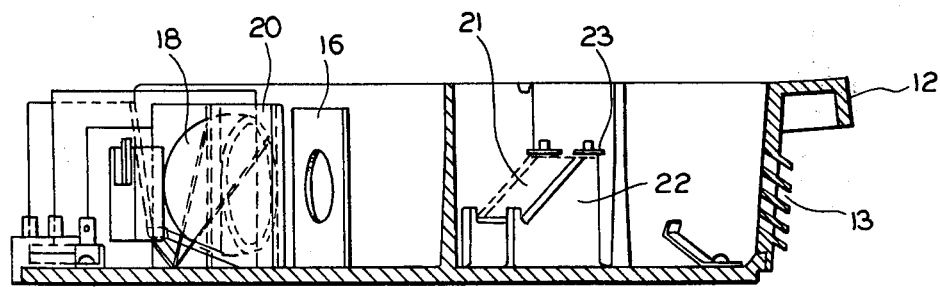
FIG. 3 is a side sectional view of the drawer taken along line B—B of FIG. 2.

As shown in FIG. 1, the inventive lamp assembly and power module or transformer for a fanless microfiche reader comprises a microfiche reader housing, generally designated by the numeral 10. The reader includes a projection system for projecting an image onto viewing surface 44 along light path 45. The housing 10 also includes a drawer 11 removably disposed in the base of housing 10, which holds a lamp assembly and power module for providing power to the lamp. The lamp assembly and power module are disposed in a chamber 46 formed by the base of drawer 11 and the surrounding portion of housing 10. Alternately the drawer 11 may have its own sidewalls integrally formed with or attached to the base. In this alternate configuration the sidewalls of the drawer are slidably received within the sidewalls of the housing 10. When drawer 11 is in its closed position, as shown in FIG. 1, chamber 46 forms a restricted air path in the base of housing 10. The rear of housing 10 includes a vertically rising chimney 14, having a vent 15 at the top of the chimney. As shown in FIGS. 1 and 3 the drawer 11 includes a handle 12 at the front of the drawer into and out of housing 10. The front of drawer 11 also includes an air intake grille 13 to allow the passage of air into chamber 46 in the closed drawer as will be explained.

Figure 2:
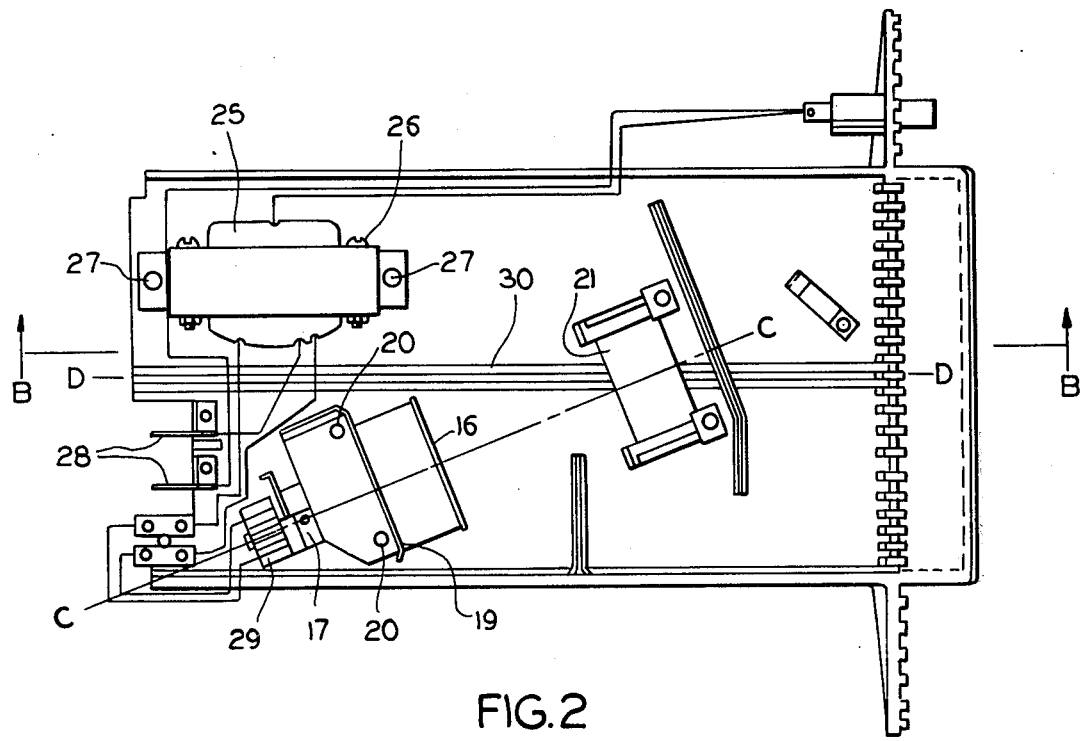
FIG. 2 is a top view of the drawer illustrating the location of the lamp assembly and power module.

As shown in FIGS. 2 and 3, the lamp assembly, or light projection system, disposed in the drawer 10 comprises a lamp shield 16, a reflector lamp 17, a reflector shield 19, and attachment means 20 for connecting the reflector shield 19 to drawer 10. The projection system further comprises a mirror 21, a base 22 for holding the mirror, and a spring clip 23 for holding the mirror 21 to the base 22 at its proper angle.

As seen in FIG. 2, the reflector lamp 17 and mirror 21 are oriented on a line C—C which is at an angle to the line D—D. Line D—D is parallel to the longitudinal axis of the drawer 11, and the longitudinal axis of the microfiche reader housing 10. Mirror 21 is properly positioned to reflect light upward through the lens system 31, 32 of the reader 10 by correcting for the angular dimension between lines C—C and D—D.

As seen in FIGS. 2 and 3, a power module for the lamp 17 is contained in the drawer 11 and comprises a voltage transformer 25. In the preferred embodiment harnessing means 26 and screw means 27 secure the transformer to the bottom plate of the drawer 11. One side of the transformer 25 is connected to a lamp socket 29. Finally, as seen in FIG. 2, a barrier wall 30 stands between the transformer 25 and the lamp 17 to minimize the radiation of heat from the lamp to the transformer.

The placement of the projection system including lamp 17 and mirror 21 on angled line C—C produces two immediate advantages. First, compactness of reader construction can be obtained since room is thus provided in the drawer 11 for the only other heat producing element of the system, transformer 25. Having both transformer 25 and lamp 17 in sliding drawer 11 allows the drawer to be easily removed and replaced in housing 10, whereby each element in the drawer can be readily replaced or serviced if the need arises.

The second advantage is that both lamp 17 and transformer 25 are located in the rear of drawer 11, substantially directly below chimney 14. Chimney 14 rises vertically and forms part of housing 10, and is disposed entirely behind projection mirror 42. Thus, mirror 42 does not interfere with the vertical rise of chimney 14. Therefore, as the lamp and transformer heat the surrounding air, the heated air can rise vertically practically undisturbed through the chimney until it reaches vent 15 and is dissipated into the air. The convection currents caused by the rising air in chimney 14 draw cooler air into grille 13, and this cooler air passes through chamber 46 and into contact with lamp 17 and transformer 25 to complete the convection cooling cycle of the present invention. Since the heat producing elements are located at the rear of drawer 11, other parts of the reader such as the glass flat carriage deck and lens system are not unnecessarily heated.

The reflector shield 19 surrounding lamp 17 is preferably a dichroic material or reflector of the type which allows radiation in the infrared spectrum to pass through the reflector, while reflecting radiation in the visible spectrum. The visible light is focused in a beam directed towards mirror 21 with a large percentage of the infrared radiation removed from the beam. The fiche being viewed is thus subject to less heating and the possibility of warping or burning. The infrared radiation passed through the dichroic reflector is then directed back towards the base of the chimney 14 which is resultantly heated. The air adjacent the chimney base is also heated and rises through vent 15. This air flow aids in the necessary cooling convention current which draws cool air through intake grill 13 and over the components in drawer 11.

The invention thus provides a fanless cooling action. The heat generated by lamp 17 and transformer 25 heats the air in the drawer 11. The air flow through the drawer or chamber cools the lamp assembly and power module.

The operation of the invention should now be clear to those skilled in the art. All of the electrical components comprising the lamp assembly and the power module are contained in the drawer 11. The orientation of the lamp assembly on line C—C at an angle to the longitudinal axis of the drawer 11 allows both the lamp assembly and the power module 25 to fit in the drawer 11 without making the drawer 11 disproportionately large with relation to the reader 10. The angle of the lamp 17 and the mirror 21 is compensated by the orientation of the mirror 21, which, as seen in FIG. 1, is oriented to reflect the light from the lamp 17 through the lens system 31, 32.

While the principles of the invention have been described above in connection with specific apparatus and applications, it is to be understood that this description is made only by way of example and not as a limitation on the scope of the invention.

We claim:

1. In a microform display apparatus having a lamp assembly, a power module operatively connected to the lamp assembly to provide power to illuminate the lamp, a mirror assembly and a lens system in a housing for projecting an image on a viewing surface, the housing including a base having a center line extending along a longitudinal axis from the front to the back of the housing, the improvement comprising:
    means defining a chamber at the base of the housing;
    means for mounting the lamp assembly in said chamber at a point remote from the center line for projecting a beam of light at a predetermined acute angle with respect to the longitudinal axis toward the mirror assembly;
    means for mounting the power module in said chamber on the other side of the longitudinal axis from said lamp assembly;
    means for mounting the mirror assembly in said chamber so as to reflect light from the lamp assembly to the lens system;
    means defining an air inlet at one end of said chamber;
    a substantially vertically rising chimney in said housing and communicating with the end of said chamber opposite said air inlet and substantially over the lamp assembly and power module;
    and dichroic reflector means disposed in said chamber so as to selectively direct visible light from the lamp assembly to the mirror assembly and allow infra red radiation to pass in a direction toward the chimney,
    whereby cooling air flows from said air inlet, passes over the lamp assembly and the power module where heat is transferred to the cooling air, and then rises in said chimney where it escapes from the housing.

2. The improvement as set forth in claim 1 wherein the housing includes a removable disposed drawer defining said chamber, the base of the housing comprising a base of said drawer, and said lamp assembly and power module are mounted on a portion of said drawer base which extends substantially beneath said chimney when said drawer is located in the housing.

3. The improvement as set forth in claim 1 wherein said chimney is disposed in the rear of said housing, and said lamp assembly is mounted at the rear of said chamber.

4. In a microform display apparatus having a lamp assembly, a power module to provide power to the lamp assembly, a mirror assembly and a lens system in a housing for projecting an image on a viewing surface, the improvement comprising:
    a drawer slidably disposed within the base of the housing, the drawer having a center line extending along a longitudinal axis from the front to the back of the drawer;

means for mounting the lamp assembly in said drawer at a point remote from the center line for projecting a beam of light at a predetermined acute angle with respect to the longitudinal axis toward the mirror assembly;

means for mounting the power module in said drawer on the other side of the longitudinal axis from said lamp assembly;

means for mounting the mirror assembly in the drawer so as to reflect light from the lamp assembly to the lens system;

means defining an air inlet at one end of said drawer;

a substantially vertically rising chimney in said housing and communicating with the end of said drawer opposite said air inlet and substantially over the lamp assembly and power module;

and dichroic reflecter means disposed in said drawer so as to selectively direct visible light from the lamp assembly to the mirror assembly and allow infra red radiation to pass in a direction toward the chimney, whereby cooling air flows from said air inlet, passes over the lamp assembly and power module where heat is transferred to the cooling air, and then rises in said chimney where it escapes from the housing, and whereby easy access to the lamp and mirror assembly in said drawer is provided by virtue of said drawer being slidably removable from the housing.

5. The improvement as set forth in claim 4 wherein said chimney has a base situated with respect to said dichroic reflector means such that infra red radiation passing through said dichroic reflector means is incident upon the base of said chimney, whereby the base of said chimney and the adjacent air is heated to enhance the flow of air upwardly through the chimney, thereby aiding the convection cooling of the assemblies within said drawer.

* * * * *